United States Patent [19]
Kuroda

[11] Patent Number: 5,671,193
[45] Date of Patent: Sep. 23, 1997

[54] ROTARY POLYGONAL MIRROR AND METHOD OF MANUFACTURING THE SAME

[75] Inventor: Masaaki Kuroda, Tokyo, Japan

[73] Assignee: Canon Kabushiki Kaisha, Tokyo, Japan

[21] Appl. No.: 401,979

[22] Filed: Mar. 10, 1995

[30] Foreign Application Priority Data

Mar. 11, 1994 [JP] Japan ................... 6-067535

[51] Int. Cl.⁶ .................... G02B 26/08; B29D 11/00
[52] U.S. Cl. .................... 359/216; 359/196; 359/217; 359/850; 359/855; 359/872; 264/1.1
[58] Field of Search .................... 359/198–200, 359/216–219, 848, 850, 855, 872, 876; 264/1.1, 1.9, 328.1

[56] References Cited

U.S. PATENT DOCUMENTS

| | | | |
|---|---|---|---|
| 4,101,365 | 7/1978 | Fisli | 156/294 |
| 4,756,586 | 7/1988 | Witteveen | 359/218 |
| 5,134,514 | 7/1992 | Murakoshi et al. | 359/216 |
| 5,361,170 | 11/1994 | Takeyasu | 359/850 |

FOREIGN PATENT DOCUMENTS

| | | |
|---|---|---|
| 61-122621 | 6/1986 | Japan . |
| 61-170719 | 8/1986 | Japan . |

*Primary Examiner*—Paul M. Dzierzynski
*Assistant Examiner*—Darren E. Schuberg
*Attorney, Agent, or Firm*—Fitzpatrick, Cella, Harper & Scinto

[57] ABSTRACT

A rotary polygonal mirror for a deflection scanning device includes a regular prism-shaped main body portion consisting of a resin material, a projecting portion which projects from an upper surface of a central portion of the main body portion, and a reflection film formed on side surfaces of the main body portion. The projecting portion consists of the same resin material as the resin material of the main body portion. The main body portion and the projecting portion are integrally molded by injection molding or injection compression molding. A gate portion in the molding is provided to the projecting portion.

17 Claims, 5 Drawing Sheets

ROTARY POLYGONAL MIRROR AND METHOD OF MANUFACTURING THE SAME

BACKGROUND OF THE INVENTION

1. Field of the Invention

The present invention relates to a rotary polygonal mirror for a deflection scanning device used in a laser printer, a laser facsimile apparatus; or the like, and a method of manufacturing the same.

2. Related Background Art

As shown in FIG. 1, in a deflection scanning device used in a laser printer, a laser facsimile apparatus, or the like, a laser beam $L_1$ generated by a semiconductor laser S is collimated by a collimator lens (not shown), and is condensed into a line shape by a cylindrical lens C. The focused laser beam is then irradiated onto each of mirror surfaces 101a on the outer circumferential surface of a rotary polygonal mirror 101. A laser beam $L_2$ deflected upon rotation of the rotary polygonal mirror 101 is focused on a photosensitive body on a rotary drum D via a focusing lens F and a return mirror M, and forms an electrostatic latent image by main scans upon rotation of the rotary polygonal mirror 101 and sub-scans upon rotation of the rotary drum D. Some light components of the laser beam $L_2$ deflected by the rotary polygonal mirror 101 are reflected by a detection mirror N to the light-receiving end of an optical fiber G, and are input to the semiconductor laser S as a write start signal. Note that the rotary polygonal mirror 101, the focusing lens F, the return mirror M, the detection mirror N, the optical fiber G, and the like are accommodated in an optical box E, and the semiconductor laser S is mounted on one side wall of the optical box E. An output window W is formed on the bottom wall of the optical box E and outputs a laser beam $L_3$ which has been reflected by the return mirror M toward the rotary drum D.

As shown in FIG. 2, a driving system for rotating the rotary polygonal mirror 101 is constituted by a rotor 104 which is integrated with a shaft 103 supported by a bearing 105, and a stator 106 fixed to a housing 105a of the bearing 105. The rotor 104 and the stator 106 constitute a motor for rotating the rotary polygonal mirror 101. More specifically, a magnet 104a of the rotor 104 and a coil 106a of the stator 106 are arranged to oppose each other. The rotary polygonal mirror 101 is pressed against the rotor 104 by a leaf spring 102 to be integrally coupled thereto. When a current is supplied to the coil 106a of the stator 106, from a driving circuit (not shown) on a circuit board 107 which mounts the coil 106a, the rotor 104 and the rotary polygonal mirror 101 rotated integrally.

In order to obtain such a deflection scanning device with high performance, the surface precision of each mirror surface of the rotary polygonal mirror must be very high. Thus, a conventional rotary polygonal mirror is normally manufactured as follows. A blank of optical glass is cut to manufacture a regular prism-shaped main body, and thereafter, the side surfaces of the main body are polished to form mirror surfaces. Alternatively, a metal blank of, e.g., an aluminum alloy is cut to manufacture a regular prism-shaped main body, and thereafter, the side surfaces of the main body are worked to obtain mirror surfaces by ultra-precision cutting using a diamond cutting tool.

However, in the conventional techniques, the process for manufacturing the regular prism-shaped main body by polishing or cutting a blank consisting of optical glass or a metal, and the process of working the side surfaces of the regular prism-shaped main body into mirror surfaces by polishing or ultra-precision cutting require high-grade techniques, and much labor and time, resulting in high manufacturing cost of the rotary polygonal mirror. In addition, since the main body of the rotary polygonal mirror consists of optical glass or metal, the rotary polygonal mirror is heavy, thus disturbing a decrease in weight of the deflection scanning device.

SUMMARY OF THE INVENTION

The present invention has been made in consideration of the problems of the conventional techniques, and has as its object to provide a lightweight, low-manufacturing cost rotary polygonal mirror having mirror surfaces with high surface precision, and a method of manufacturing the same.

In order to achieve the above object, a rotary polygonal mirror of the present invention comprises a rotary polygonal mirror main body having a regular prism-shaped main body portion and a projecting portion projecting from the upper surface of the central portion of the main body portion in a direction of the rotational axis, and a reflection film formed on the side surfaces of the main body portion of the rotary polygonal mirror main body, the rotary polygonal mirror main body is obtained by integrally molding the main body portion and the projecting portion by injection molding or injection compression molding, and the projecting portion has a gate portion to be used in the molding.

In particular, the reflection film comprises a metal film.

In particular, a reflection enhance film is stacked on the reflection film.

In particular, a protective film is stacked on the reflection film.

In particular, the projecting portion is formed by a resin material filled in a tab gate of a mold upon integral molding of the rotary polygonal mirror main body.

In particular, the projecting portion has a hollow portion, and the rotational shaft of the rotary polygonal mirror is inserted in the hollow portion to integrally couple the projecting portion.

A method of manufacturing a rotary polygonal mirror according to the present invention comprises the step of integrally molding a rotary polygonal mirror main body, which has a regular prism-shaped main body portion and a projecting portion projecting from the upper surface of the central portion of the main body portion in a direction of the rotational axis, and consists of a resin material, by injection molding or injection compression molding by providing a gate portion to be used upon molding to the projecting portion; the step of removing the gate portion of the projecting portion; and the step of forming a reflection film on the side surfaces of the main body portion of the rotary polygonal mirror main body from which the gate portion is removed.

In particular, the reflection film is formed by deposition or plating or sputtering.

In particular, the method further comprises the step of stacking a reflection enhance film on the formed reflection film in addition to the above-mentioned steps.

In particular, the method further comprises the step of stacking a protective film on the formed reflection film in addition to the above-mentioned steps.

According to the rotary polygonal mirror and the method of manufacturing the same according to the present invention, since the rotary polygonal mirror main body is integrally molded using a resin material, it is very light in weight, and since the number of manufacturing steps is smaller than that in a case wherein a glass or metal material is polished or cut, the manufacturing cost can be greatly reduced. In addition, since the gate portion is removed from the projecting portion projecting from the main body portion of the integrally molded rotary polygonal mirror main body, the dimensional precision of the main body portion can be prevented from being impaired by removal of the gate portion, and hence, the surface precision of the reflection film to be formed can be prevented from being lowered. As a result, a lightweight, low-manufacturing cost rotary polygonal mirror having mirror surfaces with high surface precision can be realized. If the projecting portion is formed by a resin material filled in a tab gate of a mold used for integrally molding the rotary polygonal mirror main body, the design of the mold used for integrally molding the rotary polygonal mirror main body is easy.

DETAILED DESCRIPTION OF THE PREFERRED EMBODIMENTS

An embodiment of the present invention will be described hereinafter with reference to the accompanying drawings.

Figure 3:
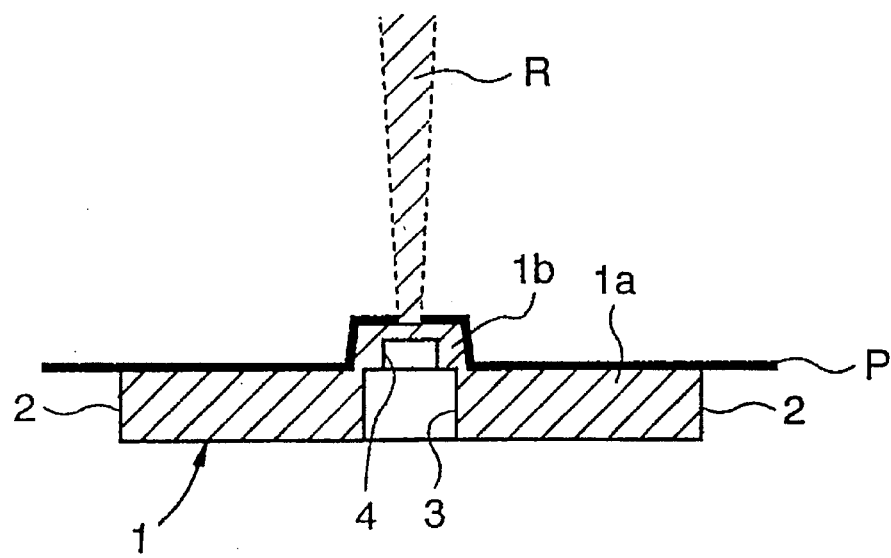
FIG. 3 is a sectional view showing only a rotary polygonal mirror according to an embodiment of the present invention.

FIG. 3 is a sectional view showing a rotary polygonal mirror according to an embodiment of the present invention. The rotary polygonal mirror shown in FIG. 3 is constituted by a rotary polygonal mirror main body 1, which consists of a resin material and has a main body portion 1a having a square prism shape and consisting of a resin material, and a boss portion 1b as a projecting portion consisting of a resin material, and a reflection film 2 formed on the outer circumferential surfaces of the side surfaces of the main body portion 1a of the rotary polygonal mirror main body 1. The rotary polygonal mirror main body 1 is integrally molded by a known injection molding method or injection compression molding method. The reflection film 2 comprises a metal film formed by a known method, and a reflection enhance film or a protective film stacked on its surface as needed, as will be described later, and constitutes mirror surfaces for reflecting a laser beam or the like to deflect and scan it in a deflection scanning device. The reflection film is formed after molding of the rotary polygonal mirror main body 1. The boss portion 1b is formed in the vicinity of a shaft hole 3, and projects in the direction of the rotational axis from the upper surface of the central portion of the main body portion 1a to surround the shaft hole 3.

Figure 4:
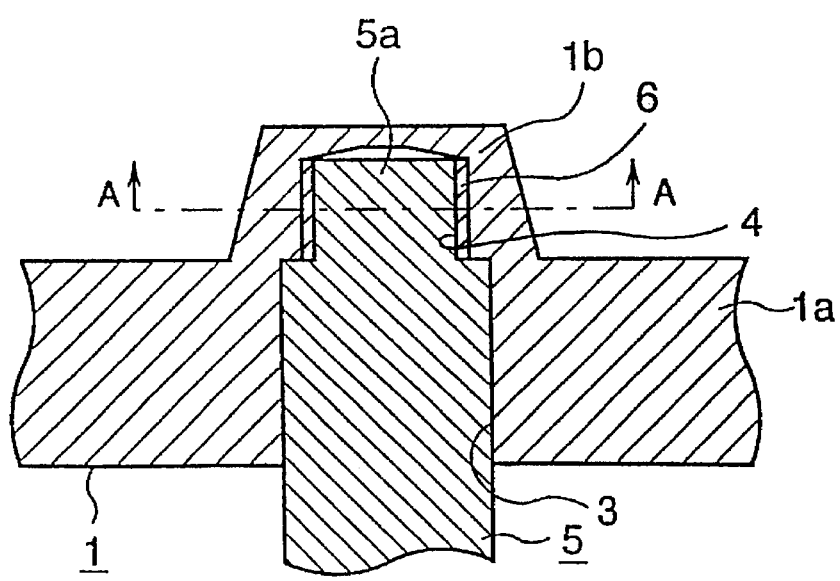
FIG. 4 is a partially enlarged sectional view showing a state wherein a shaft is attached to the rotary polygonal mirror shown in FIG. 3.

The rotary polygonal mirror main body 1 has the shaft hole 3 which is open to a surface (lower surface) opposite to the boss portion 1b and receives a motor shaft, and a gap 4 as a hollow portion extending from the shaft hole 3 into the boss portion 1b. As shown in FIG. 4, an end portion 5a of a shaft 5 as a rotational shaft of the rotary polygonal mirror main body 1 is inserted in the gap 4 via the shaft hole 3. The boss portion 1b as the projecting portion (tab) is formed by a resin material filled in the tab gate of a mold upon integral molding of the rotary polygonal mirror main body 1 by the above-mentioned method, and the main body portion 1a of the rotary polygonal mirror main body 1 is formed by a resin material which is injected into a predetermined cavity of the mold via a runner R (indicated by a dotted line) of the mold and the boss portion 1b serving as the tab gate. Therefore, the resin material which forms the main body portion 1a of the rotary polygonal mirror main body 1 is uniformly filled in the cavity of the mold since it passes through the boss portion 1b serving as the tab gate. For this reason, a trouble such as deterioration of the surface precision of the reflection film formed on the main body portion 1a due to deterioration of the surface precision of the outer circumferential surfaces of the side surfaces of the main body portion 1a caused by the deformation of the outer circumferential surfaces upon hardening of the resin material can be avoided. Furthermore, since the boss portion 1b does not require high-precision dimension finishing unlike the main body portion 1a, a gate portion need only be automatically removed by, e.g., a known runner stripper plate provided to the mold upon release of the mold to cut off the runner R. More specifically, since no high-precision gate portion removal process is required, the molding process of the rotary polygonal mirror main body 1 is very simple. In FIG. 3, P represents a parting line upon release of the mold. After the above-mentioned molding process of the rotary polygonal mirror main body 1, the reflection film 2 is formed.

Figure 2:
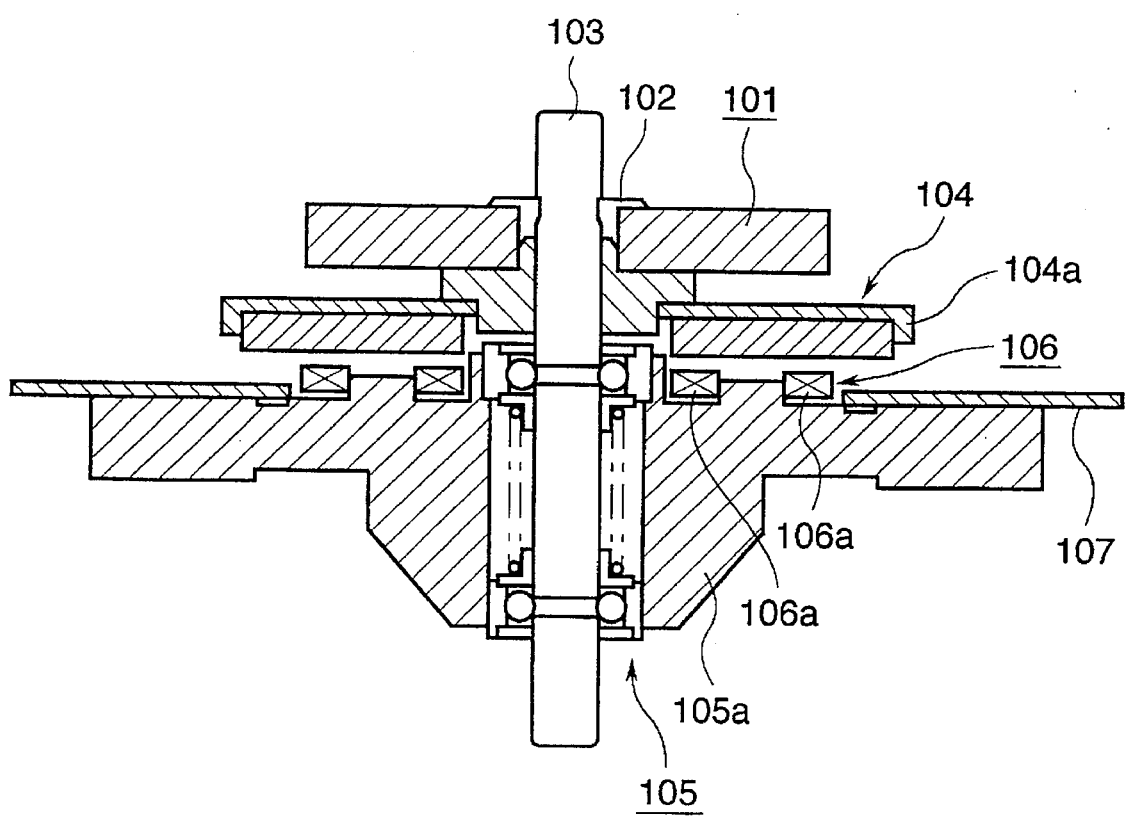
FIG. 2 is a sectional view showing a rotary polygonal mirror and its driving portion in the deflection scanning device shown in FIG. 1.

By adhering the boss portion 1b to the end portion 5a of the shaft 5 by an adhesive 6 filled between the gap 4 and the end portion 5a of the shaft 5, no metal pressing member for integrating the rotary polygonal mirror main body 1 and the shaft 5 is required, and the deflection scanning device can be remarkably simplified. Note that the shaft 5 is driven by a driving system shown in FIG. 2.

Figure 5:
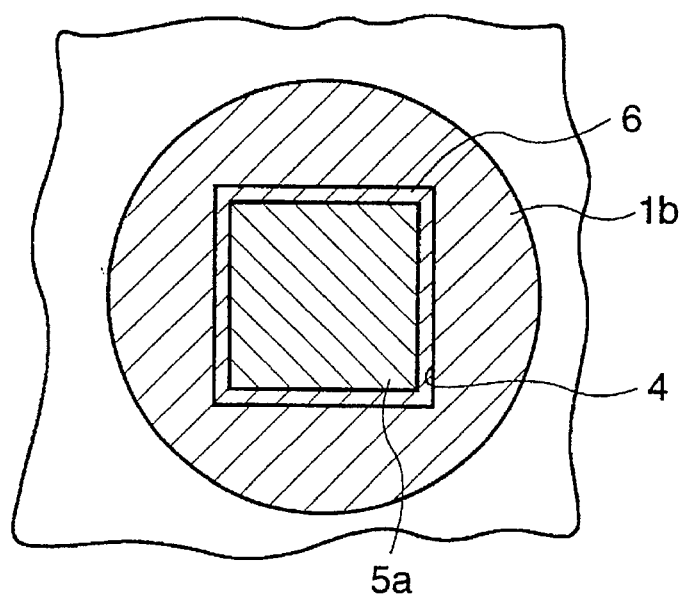
FIG. 5 is a sectional view taken along a line A—A in FIG. 4.

Needless to say, a known fixing method such as welding can be used in place of adhering the boss portion 1b of the rotary polygonal mirror main body 1 to the end portion 5a of the shaft 5. The sectional dimension of the end portion 5a of the shaft 5 is preferably smaller that of the remaining portion of the shaft 5, and preferably has a similar shape to the section of the main body portion 1a of the rotary polygonal mirror main body 1, as shown in FIG. 5.

The resin material for forming the rotary polygonal mirror main body 1 is appropriately selected from PMMA (polymethyl methacrylate), acrylimide resins, ABS resins, polycarbonates, olefin-based resins, and reinforced composite resin materials using the above-mentioned resins as base materials and reinforced by a glass fiber, carbon fiber, and the like. A metal film constituting the reflection film 2 is formed as a single-layered film or a multi-layered film consisting of the same or different types of metal films of metals suitable for obtaining a high-precision mirror surface, such as Al, Cu, Ni, Ag, Au, and the like. The above-mentioned reflection enhance film, protective film, and the like are formed on the metal film. Note that the method of forming the metal film may be any one of a chemical plating method, an electroplating method, a deposition method, and the like. The film thickness of the metal film normally falls within a range from 50 to 200 μm, which is required for obtaining a sufficient reflectance. As the material of the reflection enhance film, Al, Cu, Au, Ag, $SiO_2$, $MgF_2$, $Al_2O_3$, and the like are suitable, and its forming method preferably adopts a vacuum deposition method, a sputtering method, or the like.

According to this embodiment, since the rotary polygonal mirror main body is integrally molded using a resin material, it is light in weight as compared to that consisting of a glass or metal material, does not require any complex working processes, and can greatly shorten the manufacturing time, resulting in low manufacturing cost. Furthermore, the manufacture of a rotary polygonal mirror having a complex shape such as a hexagonal prism shape or one with an irregular-shaped three-dimensional pattern is very easy. In addition, the boss portion consisting of the resin material filled in the tab gate upon molding remains on the rotary polygonal mirror main body, and the gate portion upon molding is removed at the boss portion. For this reason, the removal of the gate portion does not impair dimensional precision of the shaft hole and the outer circumferential surfaces of the side surfaces of the main body portion of the rotary polygonal mirror main body. Therefore, the removal of the gate portion does not require any special high-grade techniques, thus preventing an increase in cost. The gate portion may deform due to concentration of the residual stress upon hardening of the resin material. However, since the outer circumferential surfaces of the side surfaces of the main body portion are separated from the gate portion, they will not be influenced by the deformation. Furthermore, since the rotary polygonal mirror and the shaft can be integrated by fixing the gap of the boss portion to the shaft of the rotary polygonal mirror without impairing the surface precision of the mirror surfaces of the rotary polygonal mirror, simplification of the manufacturing process of the rotary polygonal mirror of the resin material and a great reduction in the number of assembling parts can be easily attained.

Figure 6A:
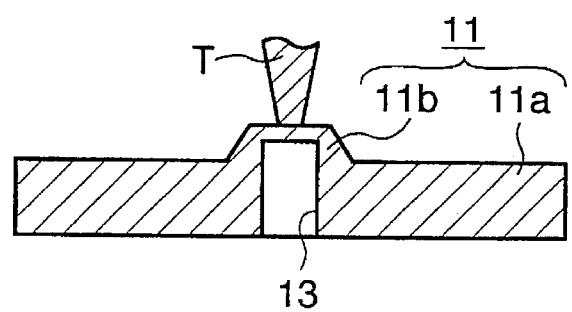
FIGS. 6A and 6B are sectional views showing a rotary polygonal mirror according to a modification of the embodiment, in which FIGS. 6A and 6B respectively show states before and after gate cut.
Figure 6B:
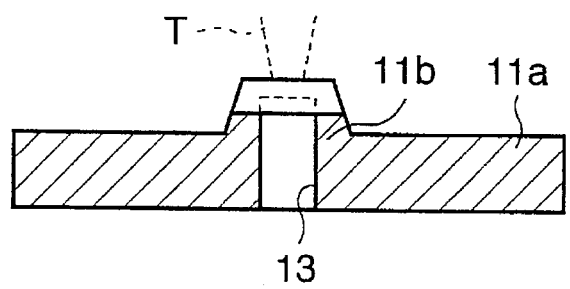

FIGS. 6A and 6B show a modification of this embodiment. In this modification, after a rotary polygonal mirror main body 11 which is the same as the rotary polygonal mirror main body 1 of this embodiment is integrally molded by the injection molding method or injection compression molding method, as shown in FIG. 6A, a gate portion provided to the distal end portion of a boss portion 11b as a projecting portion (tab) is removed together with a runner T, as shown in FIG. 6B to open a shaft hole 13 of the rotary polygonal mirror main body 11 at the boss portion 11b side as well, so that a shaft (not shown) can extend through the rotary polygonal mirror main body. After the gate portion is removed, a reflection film is formed on the outer circumferential surfaces of the side surfaces of the rotary polygonal mirror main body 11. In this manner, even when the gate portion including a portion of the boss portion 11b is removed, the dimensional precision of the outer circumferential surfaces and the shaft hole 13 of the rotary polygonal mirror main body 11 is not lowered.

Figure 7:
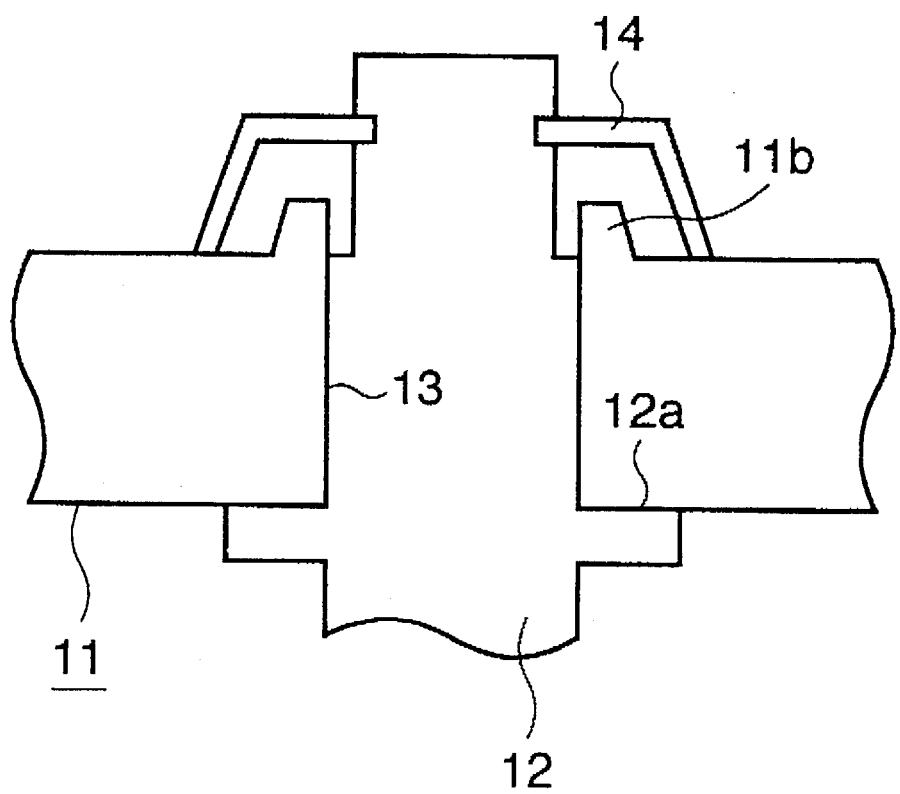
FIG. 7 is a partially enlarged sectional view showing a state wherein a shaft is attached to the rotary polygonal mirror shown in FIGS. 6A and 6B.

FIG. 7 is a partially enlarged sectional view showing a state wherein a shaft is attached to the rotary polygonal mirror shown in FIGS. 6A and 6B.

The rotary polygonal mirror main body 11 is fitted, from above, on a shaft 12 as a rotational shaft, and is brought into contact with a receiving surface 12a formed on the shaft 12. By pressing the rotary polygonal mirror main body 11 by an elastic member 14 from above, the rotary polygonal mirror main body 11 is fixed on the receiving surface 12a. Note that the elastic member 14 is locked since it is fitted in a recess portion on the shaft 12. The shaft 12 is rotated using a driving system shown in FIG. 2.

The rotary polygonal mirror shown in FIG. 3 is manufactured by integrally molding the rotary polygonal mirror main body 1 constituted by the prism-shaped main body portion 1a and the boss portion 1b projecting from the end face of the main body portion 1a by the injection molding or injection compression molding, and then cutting off the runner R by removing the gate portion at the boss portion 1b. The boss portion 1b has the gap 4 communicating with the shaft hole 3 of the main body portion 1a, and the shaft 5 for rotating the rotary polygonal mirror main body 1 is integrated with the rotary polygonal mirror main body 1 by adhering its distal end inserted into the gap 4 of the boss portion 1b via the shaft hole 3. In this manner, in the rotary polygonal mirror shown in FIG. 3, the tab gate used in molding remains as the boss portion 1b after molding. The boss portion 1b is utilized as a member for fixing the shaft 5.

In contrast to this, in the rotary polygonal mirror shown in FIGS. 6A and 6B, a portion of the boss portion 1b which remains after molding is removed, so that the shaft 12 can extend through the rotary polygonal mirror main body 11.

Since the gate portion often deforms due to concentration of the residual stress upon hardening of the resin material, it is preferably removed to allow high-precision attachment of the rotary polygonal mirror, as shown in FIGS. 6A and 6B.

Since the present invention has the above-mentioned arrangement, it can provide the following effects.

A lightweight, low-manufacturing cost rotary polygonal mirror having mirror surfaces with high surface precision can be realized.

Figure 1:
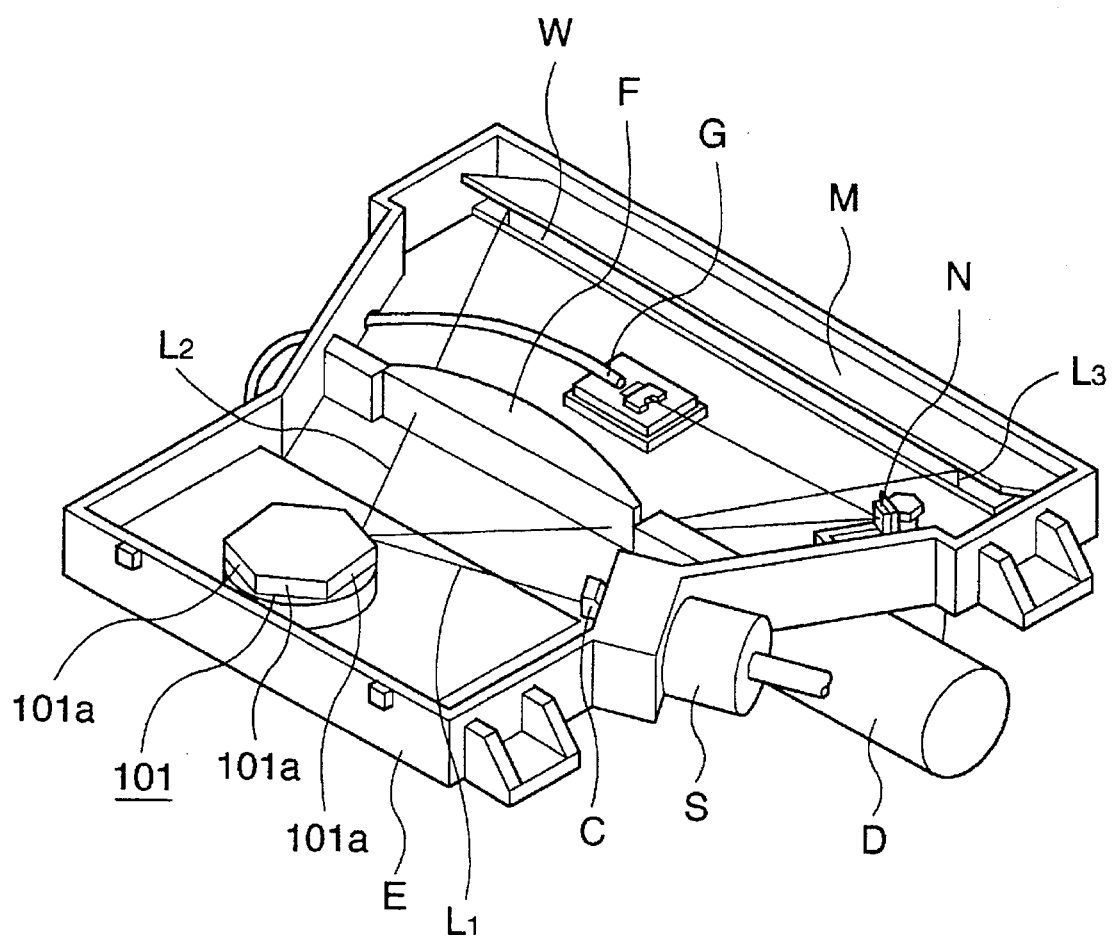
FIG. 1 is a perspective view showing principal parts of a general deflection scanning device.

The rotary polygonal mirror of the present invention can be used in a deflection scanning device used in a laser beam printer or the like shown in FIG. 1. When the rotary polygonal mirror shown in FIG. 3 or FIGS. 6A and 6B is used, a lightweight, low-cost, and high-precision deflection scanning device can be easily realized.

What is claimed is:

1. A rotary polygonal mirror comprising:

a regular prism-shaped main body portion including a resin material;

a projecting portion which projects from an upper surface of a central portion of said main body portion, said projecting portion having the same resin material as the resin material of said main body portion; and a reflection film formed on side surfaces of said main body portion, wherein said main body portion and said projecting portion are integrally molded by injection molding or injection compression molding, and a gate portion in the molding is provided to said projecting portion.

2. A rotary polygonal mirror according to claim 1, wherein said reflection film comprises a metal film.

3. A rotary polygonal mirror according to claim 1, wherein a reflection enhance film is stacked on said reflection film.

4. A rotary polygonal mirror according to claim 1, wherein a protective film is stacked on said reflection film.

5. A rotary polygonal mirror according to claim 1, wherein said projecting portion is formed by a resin material filled in a tab gate of a mold used in the molding.

6. A rotary polygonal mirror according to claim 1, wherein said projecting portion has a hollow portion, and a rotational shaft is inserted in the hollow portion, and said projecting portion is integrally coupled to the rotational shaft.

7. A rotary polygonal mirror comprising:
a regular prism-shaped main body portion including a resin material, with a shaft hole formed in a central portion of said main body portion;
a projecting portion formed in the vicinity of the shaft hole and projecting from an upper surface of said main body portion, said projecting portion having the same resin material as the resin material of said main body portion; and
a reflection film formed on side surfaces of said main body portion,
wherein said main body portion and said projecting portion are integrally molded by injection molding or injection compression molding, and a gate portion to be used in the molding is provided to said projecting portion.

8. A method of manufacturing a rotary polygonal mirror, comprising the steps of:
integrally molding a rotary polygonal mirror main body, which comprises a regular prism-shaped main body portion and a projecting portion projecting from an upper surface of a central portion of the main body portion by injection molding or injection compression molding using a resin material by providing a gate portion to be used in molding to the projecting portion;
removing the gate portion at the projecting portion after molding the main body; and
forming a reflection film on side surfaces of the rotary polygonal mirror main body after the gate portion is removed.

9. A method according to claim 8, wherein the reflection film is formed by deposition or plating or sputtering.

10. A method according to claim 8, further comprising the step of:
stacking a reflection enhance film on the reflection film after the step of forming the reflection film.

11. A method according to claim 8, further comprising the step of:
stacking a protective film on said reflection film after the step of forming said reflection film.

12. A light deflection device comprising:
a rotary polygonal mirror for deflecting a light beam, said rotary polygonal mirror comprising (I) a regular prism-shaped main body portion including a resin material, (II) a projecting portion which has the same resin material as the resin material of said main body portion, and projects from an upper surface of a central portion of said main body and (III) a reflection film formed on side surfaces of said main body portion; and
driving means for rotating said rotary polygonal mirror,
wherein said main body portion and said projecting portion are integrally molded by injection molding or injection compression molding, and a gate portion to be used in the molding is provided to said projecting portion.

13. A light deflection device comprising:
a rotary polygonal mirror for deflecting a light beam, said rotary polygonal mirror comprising (I) a regular prism-shaped main body portion including a resin material, (II) a shaft hole formed in a central portion of said main body portion, (III) a projecting portion which has the same resin material as the resin material of said main body portion, and projects from an upper surface of said main body portion in the vicinity of the shaft hole, and (IV) a reflection film formed on side surfaces of said main body portion; and driving means for rotating said rotary polygonal mirror,
wherein said main body portion and said projecting portion are integrally molded by injection molding or injection compression molding, and a gate portion to be used in the molding is provided to said projecting portion.

14. A deflection scanning device comprising:
a light source;
a rotary polygonal mirror for deflecting a light beam from said light source, said rotary polygonal mirror comprising (I) a regular prism-shaped main body portion including a resin material, (II) a projecting portion which has the same resin material as the resin material of said main body portion, and projects from an upper surface of a central portion of said main body portion, and (III) a reflection film formed on side surfaces of said main body portion; and driving means for rotating said rotary polygonal mirror,
wherein said main body portion and said projecting portion are integrally molded by injection molding or injection compression molding, and a gate portion to be used in the molding is provided to said projecting portion.

15. A deflection scanning device comprising:
a light source;
a rotary polygonal mirror for deflecting a light beam from said light source, said rotary polygonal mirror comprising (I) a regular prism-shaped main body portion including a resin material, (II) a shaft hole formed in a central portion of said main body portion, (III) a projecting portion which has the same resin material as the resin material of said main body portion, and projects from an upper surface of said main body portion in the vicinity of the shaft hole, and (IV) a reflection film formed on side surfaces of said main body portion; and driving means for rotating said rotary polygonal mirror,
wherein said main body portion and said projecting portion are integrally molded by injection molding or injection compression molding, and a gate portion to be used in the molding is provided to said projecting portion.

16. A laser beam printer apparatus comprising:
a light source;
a rotary polygonal mirror for deflecting a light beam from said light source, said rotary polygonal mirror comprising (I) a regular prism-shaped main body portion including a resin material, (II) a projecting portion which has the same resin material as the resin material of said main body portion, and projects from an upper surface of a central portion of said main body portion, and (III) a reflection film formed on side surfaces of said main body portion;

driving means for rotating said rotary polygonal mirror; and a photosensitive body for receiving the light beam deflected by said rotary polygonal mirror,
wherein said main body portion and said projecting portion are integrally molded by injection molding or injection compression molding, and a gate portion to be used in the molding is provided to said projecting portion.

17. A laser beam printer apparatus comprising:
a light source;

a rotary polygonal mirror for deflecting a light beam from said light source, said rotary polygonal mirror comprising (I) a regular prism-shaped main body portion including a resin material, (II) a shaft hole formed in a central portion of said main body portion, (III) a projecting portion which has the same resin material as the resin material of said main body portion, and projects from an upper surface of said main body portion in the vicinity of the shaft hole, and (IV) a reflection film formed on side surfaces of said main body portion;

driving means for rotating said rotary polygonal mirror; and a photosensitive body for receiving the light beam deflected by said rotary polygonal mirror, wherein said main body portion and said projecting portion are integrally molded by injection molding or injection compression molding, and a gate portion to be used in the molding is provided to said projecting portion.

* * * * *

UNITED STATES PATENT AND TRADEMARK OFFICE
CERTIFICATE OF CORRECTION

PATENT NO. : 5,671,193
DATED : September 23, 1997
INVENTOR(S) : Kuroda

It is certified that error appears in the above-identified patent and that said Letters Patent is hereby corrected as shown below:

COLUMN 7:

Line 46, "portion," should read --portion--;
Line 48, "body" should read --body portion,--; and
Line 64, "portion," should read --portion--.

COLUMN 8:

Line 14, "portion," should read --portion--;
Line 34, "portion," should read --portion--; and
Line 52, "portion," should read --portion--.

COLUMN 9:

Line 7, "portion," should read --portion--.

Signed and Sealed this

Sixteenth Day of June, 1998

Attest:

BRUCE LEHMAN

*Attesting Officer*    *Commissioner of Patents and Trademarks*